United States Patent Office 3,402,025
Patented Sept. 17, 1968

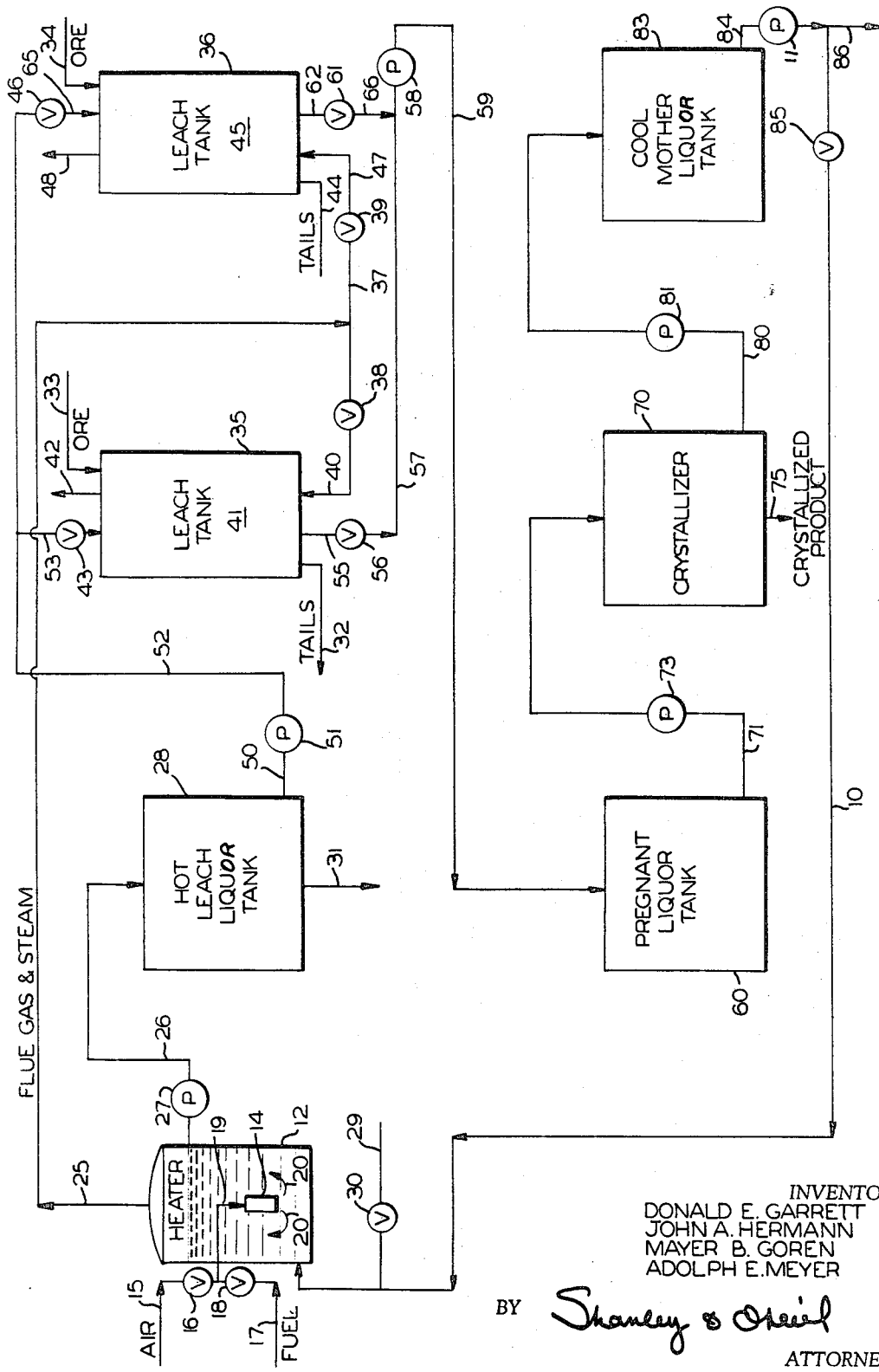

3,402,025
POTASSIUM CHLORIDE RECOVERY FROM POTASH ORES USING SUBMERGED COMBUSTION HEATING
Donald E. Garrett, Pomona, Calif., John A. Hermann, Oklahoma City, Okla., and Mayer B. Goren, Golden, and Adolph E. Meyer, Wheatridge, Colo. (all % Kerr-McGee Oil Industries, Inc., Kerr-McGee Bldg., Oklahoma City, Okla. 73102)
Filed Oct. 14, 1964, Ser. No. 403,724
6 Claims. (Cl. 23—312)

ABSTRACT OF THE DISCLOSURE

Carlsbad-type potash ore is leached with heated aqueous leach liquor containing potassium chloride and sodium chloride. A submerged combustion heater is immersed in the leach liquor to heat it and produce a hot gaseous mixture containing combustion gases and steam which is used in heating the ore.

---

This invention broadly relates to improved apparatus and a novel process for heating ore. In some of its more specific aspects, the invention further relates to improved apparatus and a novel process for heating ore and leach liquor, and for leaching ore.

A wide variety of ores containing solvent-soluble constituents are amenable to processing by leaching with a selected solvent. As examples of ores that may be processed by leaching, and especially percolation leaching, there may be mentioned ores of soluble potassium salts such as potassium chloride, ores of soluble nitrate salts such as sodium nitrate (caliche), and ores of borax.

In the interest of clarity, the present invention will be described and illustrated hereinafter with specific reference to the processing of potash ores of the type found in the Carlsbad region of New Mexico. However, it will be understood by those skilled in the art that the invention is not limited thereto and ores in general that are known to be amenable to leaching may be used.

In the percolation leaching of Carlsbad potash ore, the prior art practice has been to heat the ore by passing steam therethrough. In instances where an attempt was made to substitute other hot gaseous mediums for steam in heating the ore, it was found that the ore decrepitated and an excessive amount of slimes formed upon leaching. This interfered markedly with the leaching step and also with the clarification of the leach liquor. Therefore, efforts to employ flue gas as a heating agent for Carlsbad type potash ores, and especially ores to be processed by percolation leaching, has not been successful heretofore.

It is the usual practice when leaching Carlsbad ore to employ a leach liquor which is substantially saturated with respect to potassium chloride and sodium chloride at a relatively low temperature such as normal ambient temperature, and then to heat the leach liquor to a higher temperature. The resulting hot leach liquor may be contacted with potash ore and additional potassium values are solubilized while very little, if any, sodium chloride is solubilized. It is also desirable that the ore bed be heated to at least the initial temperature of the leach liquor prior to commencing the leaching step so as to not unduly cool the hot leach liquor before the potassium values are solubilized.

It has not been practical heretofore to simultaneously heat the leach liquor and the potash ore bed and thus the prior art leaching processes were not as efficient as desired. The cost of heating the ore and leach liquor was high due to the relatively inefficient use of the heat content of the fuel and the operating expenses were high as a large amount of equipment was necessary. It is possible in accordance with the present invention to overcome these disadvantages of the prior art.

It is an object of the present invention to provide improved apparatus and a novel process for heating ore.

It is a further object to provide improved apparatus and a novel process for heating leach liquor to be used in the leaching of ores.

It is still a further object to provide improved apparatus and a novel process for simultaneously heating ore and leach liquor, and for leaching the heated ore with the hot leach liquor.

Still other objects and advantages of the invention will be apparent to those skilled in the art upon reference to the following detailed description and the drawing, which illustrates a presently preferred arrangement of apparatus for use in practicing the novel process of the invention.

Referring now to the drawing, which illustrates a presently preferred arrangement of apparatus for use in processing Carlsbad potash ore, a relatively cool aqueous medium which may be mother liquor substantially saturated with respect to potassium chloride and sodium chloride at its existing temperature is passed via conduit 10 at a rate controlled by pump 11 to heater 12. The cool mother liquor is heated to a desired higher temperature as it passes through heater 12 by means of submerged combustion heater unit 14. An oxygen-containing gas such as air and a carbonaceous fuel which may be natural gas or a liquid hydrocarbon are supplied under pressure via conduits 15 and 17 at rates controlled by valves 16 and 18, respectively, to form a combustible mixture flowing in conduit 19 which is passed to the submerged combustion unit 14 and ignited. The combustible mixture preferably contains sufficient oxygen to completely burn the carbonaceous fuel. The submerged combustion heater unit 14 is mounted near the bottom of heater 12 and within the mother liquor whereby the hot gases of combustion are passed upward through the mother liquor in the direction indicated by the arrows 20. Thus, the mother liquor is heated in a very efficient manner and preferably to its boiling point by the radiant heat from the flame within combustion heater unit 14, and also by the hot combustion gases which bubble up through the mother liquor.

The resultant gaseous mixture of flue gases and steam is withdrawn from the top of heater 12 via conduit 25, and the hot mother liquor or leach liquor is withdrawn via conduit 26 at a rate controlled by pump 27 and passed to hot leach liquor tank 28. The hot gaseous mixture and the hot leach liquor may be initially at substantially the same temperature, which may be substantially the boiling point of the leach liquor under the pressure existing in heater 12.

The heater 12 may be operated under at least atmospheric pressure, and preferably under a superatmospheric pressure such as 5–50 p.s.i.g. The feed of cool mother liquor and its withdrawn rate is such that the mother liquor is heated to its boiling point and preferably to at least 212° F. and a portion is evaporated to thereby provide a substantial proportion of steam in the combustion or flue gases. For example, the gaseous mixture flowing within conduit 25 may contain 10–90% and preferably 30–90% by volume of steam and the remainder largely flue gases. Usually a gaseous mixture containing about one volume of steam for each two volumes of flue gas is preferred. Operating the heater as described above has the additional beneficial effect of concentrating the mother liquor somewhat and thereby removing excess water from the system. Also, it is often possible to precipitate a portion of an undesired constituent in tank 28, such as sodium chloride from a sodium chloride-potassium chloride brine, which may be removed via conduit 31 and discarded. In instances where it is desirable, make-up water or other suitable aqueous leaching medium may be added to the cool mother liquor flowing in conduit 10 via conduit 29 at a rate controlled by valve 30 to compensate for unusually large losses of water in heater 12.

The leach tanks 35 and 36 are arranged so as to be capable of being used alternately for heating and leaching the ore, with one being on-stream for heating and the other being on-stream for leaching in a given instance. Mined ore in particulate form which may contain a desired water soluble substance, such as crushed potash ore, may be charged to the tops of the leach tanks 35 and 36 via conduits 33 and 34, respectively, to thereby provide beds of ore 41 and 45 within the leach tanks for heating to a desired temperature and then leaching with hot leach liquor. In instances where the ore body within tank 35 is to be heated, the hot mixture of flue gases and steam flowing in conduit 25 is passed to conduit 37 and, upon opening valve 38 and closing valve 39, it is passed to the bottom of leach tank 35 via conduit 40. Since the heater 12 is operated under a superatmospheric pressure, the hot gaseous mixture flowing in conduit 25 is likewise under a superatmospheric pressure and it is forced upward through the body of ore 41. The cooled gases emerge from the top of leach tank 35 via conduit 42. During the heating of the ore body 41, the valves 43 and 56 are closed and leach liquor does not normally flow through tank 35.

In instances where it is desired to heat the body of ore 45 in leach tank 36, then valves 38, 46 and 61 are closed and valve 39 is opened, and the hot gaseous mixture flowing within conduit 25 is passed via conduits 37 and 47 to the bottom of leach tank 36. The hot gaseous mixture is forced upward through tank 36 to heat the ore and then the cooled gases are passed from the top of tank 36 via conduit 48. The heating of the ore is continued in each instance for a sufficient period of time for it to reach a desired leaching temperature which is often approximately the same temperature as the leach liquor. Usually, about 30 minutes to 1½ hours is sufficient to heat the ore.

The hot leach liquor within tank 28 is withdrawn via conduit 50 and transferred by means of pump 51 via conduit 52 to leach tank 35 or 36. In instances where it is desired to leach the heated body of ore 41 within tank 35, valve 46 is closed and valves 43 and 56 are opened, and the leach liquor flows through conduit 53 to leach tank 35 where it is distributed over the top of the ore and allowed to percolate downward through the body of ore 41. The resulting pregnant leach liquor is withdrawn from the bottom of leach tank 35 via conduit 55 and is passed via conduit 57 to pump 58, and is then transferred via conduit 59 to pregnant liquor tank 60. During the leaching of the ore in tank 35, the valve 61 in conduit 62 is closed and the ore bed 45 in tank 36 may be heated as described above. After leaching, the leached ore or tails may be removed as indicated by conduit 32.

In instances where it is desired to leach the body of ore 45 in leach tank 36, then valves 39, 43 and 56 are closed and valves 46 and 61 are opened. The hot leach liquor is passed via conduits 52 and 65 to the top of leach tank 36 where it is distributed over the top of the ore and allowed to percolate downward through the bed of ore 45. The resulting pregnant leach liquor emerges from the bottom of leach tank 36 via conduit 62 and is transferred via conduits 66 and 57, pump 58, and conduit 59 to pregnant liquor tank 60. During the leaching of the ore in tank 36, the bed of ore 41 in tank 35 also may be heated as described above. The leached ore may be removed and discarded after leaching as indicated by conduit 44.

When potash ore is being processed, the hot leach liquor in tank 28, which is initially unsaturated with respect to potassium chloride, may be rendered saturated or substantially so due to solubilization of potassium values in the ore bed 41 or 45. Therefore, the hot liquor within pregnant liquor tank 60 is preferably saturated or substantially saturated with potassium chloride and upon cooling to a lower temperature will deposit potassium chloride crystals as a product.

The hot pregnant liquor within tank 60 is passed to crystallizer 70 via conduit 71 by means of pump 73 and cooled to a lower temperature whereby crystals of potassium chloride are precipitated. The precipitated potassium chloride is then separated from the cool mother liquor by filtration, centrifuging or other suitable method and withdrawn via conduit 75 as a potassium chloride product. The cooled mother liquor which is now substantially reduced in potassium chloride content is withdrawn via conduit 80 and transferred by means of pump 81 to cool mother liquor tank 83. The cool mother liquor may be withdrawn via conduit 84 upon opening valve 85 and may be transferred to heater 12 via conduit 10 and pump 11 when desired.

While the processing of Carlsbad potash ore is referred to specifically above, it is understood that other ores may be used. Also, aqueous leaching agents other than the mother liquor in tank 83 may be employed. Therefore, the aqueous liquid passed to heater 12 via conduit 10 need not be cool mother liquor and in such event, the valve 85 in conduit 10 may be closed and the cool mother liquor discarded via conduit 86, and fresh leach liquor may be passed to heater 12 via conduit 29 upon opening valve 30.

By operating the heater 12 under a superatmospheric pressure, it is possible to produce a hot gaseous mixture containing flue gases and steam which has a temperature greater than 212° F. and which is likewise under superatmospheric pressure when flowing within conduit 25. This feature is of importance as it is often very desirable to provide a hot gaseous mixture under pressure and at a temperature above 212° F. in order to force it through the body of ore to be leached and to heat the ore to a sufficiently high temperature in a reasonable period of time. Also, by controlling the rate of flow of combustible gas to submerged combustion heating unit 14 and/or the rate of flow of aqueous liquid through heater 12, it is possible to heat the aqueous liquid to its boiling point under the existing pressure and provide a sufficiently high concentration of steam within the gaseous mixture that is produced to enable the flue gases to be employed in the heating of potash ore without degradation of the ore and release of excessive slimes.

Two leaching tanks have been shown in the interest of simplifying the drawing. However, it is understood that any desired number of leach tanks may be employed in actual practice. For example, it is often desirable to pass the leach liquor through a plurality of leach tanks connected in series so as to assure that the leach liquor will be saturated with the desired soluble constituent of the ore. In such instances, the first leach tank in the series may be taken off-stream and a fresh leach tank placed on-stream at the end of the series to thereby provide a continuous process. Also, a standby leach tank may be provided which is heated with the hot gaseous mixture until the ore is at the desired temperature and it is ready to be placed on-stream at the end of the series for leaching.

The foregoing detailed description and the following specific example are for purposes of illustration only, and are not to be considered as limiting to the spirit or scope of the appended claims.

EXAMPLE

This example illustrates the leaching of Carlsbad potash ore in accordance with the process of the invention when employing an arrangement of apparatus similar to that illustrated in the drawing.

The Carlsbad potash ore employed in this example contained about 25% potassium chloride, 0.35% Mg, 2.81% $SO_4$, 0.35% Ca, 6% insolubles such as clays, 1.5% moisture and the remainder substantially halite. The above ore is crushed in a Pennsylvania impact crusher to pass a one-inch screen and is then charged to a leach column 35 feet in height. The leach column is of prior art construction and is provided with means for passing a hot gaseous medium into the bottom for the purpose of heating the ore as the hot gases pass up the column. The leach column is also provided with means for supplying the leach liquor uniformly to the top of the column and withdrawing a pregnant leach liquor from the bottom of the column.

The heater is a pressure vessel provided with four submerged combustion burners which are mounted therein so as to be submerged in cool mother liquor to be heated. The submerged combustion burners are provided with feed conduits extending outside of the heater and connected to supplies of compressed air and compressed natural gas under pressures of about 35 p.s.i.g. The heater is operated under a pressure of about 30 p.s.i.g. A cool brine which is mother liquor substantially saturated with respect to potassium chloride and sodium chloride at ambient temperature and which has a temperature of about 171° F. is withdrawn from a mother liquor storage tank and passed to the heater. The compressed air and natural gas is passed to the submerged combustion heaters in amounts of about 50,000 standard cubic feet per hour and 5,000 standard cubic feet per hour, respectively, and burned therein. A stream of hot brine having a temperature of about 235° F. is withdrawn and passed to an insulated hot leach liquor storage tank awaiting use as the leach liquor in leaching the potash ore. A hot gaseous mixture containing about one volume of steam for each two volumes of combustion gases and likewise having a temperature of about 235° F. and initially a pressure of about 30 p.s.i.g. is withdrawn from the top of the heater and is passed to the bottom of the leach tank, and then is passed upward through the leach tank in intimate contact with the crushed ore for the purpose of heating the same. At the end of approximately one hour, the bed of ore in the leach tank is heated to a temperature of approximately 220° F. and is ready for leaching.

The hot leach liquor is passed from the storage tank to the top of the hot column of ore, and is passed downward through the hot ore for the purpose of leaching the same. A hot pregnant leach liquor substantially saturated with respect to potassium chloride is withdrawn from the bottom of the leach tank and is passed to a pregnant liquor tank awaiting further processing in the crystallizers. The hot pregnant leach liquor is passed to prior art crystallizers where it is cooled to approximately 171° F. to crystallize out a potassium chloride product following prior art practice. The crystallized potassium chloride is separated from the resultant cool mother liquor as a product of commerce. The mother liquor is then passed to a cool mother liquor storage tank awaiting recycling back to the heater.

When operating as described above, it is possible to leach the ore without experiencing difficulties due to excessive slime formation and plugging of the ore bed. In face, the results are fully comparable to heating the ore with expensive steam. Also, the leach liquor is concentrated somewhat due to the heater evaporating a large amount of water to produce steam for the hot gaseous mixture. This aids in maintaining the water balance for the system as otherwise it is difficult to retain all of the water in the system when operating in accordance with prior art practice.

In instances where flue gases alone are fed to the leach tank for the purpose of heating the ore, then it is found that the ore decrepitates. This results in extremely low flow rates during the subsequent leaching step due to the formation of an excessive amount of slimes. Thus, use of fluid gases alone for heating the ore is unsatisfactory.

What is claimed is:

1. A process for leaching potash ore containing substantial amounts of potassium chloride and sodium chloride comprising burning carbonaceous fuel and oxygen-containing gas in a submerged combustion heater immersed in an aqueous leach liquor to thereby heat the aqueous leach liquor and produce a hot gaseous mixture containing combustion gases and steam, the aqueous leach liquor being under a superatmospheric pressure and fuel and oxygen-containing gas being burned in an amount to heat the aqueous leach liquor to a temperature greater than 212° F., the gaseous mixture being under a superatmospheric pressure as produced and initially having a temperature greater than 212° F. and containing at least 10% by volume of steam, intimately contacting the hot mixture of combustion gases and steam with a body of mined potash ore in particulate form to heat the potash ore to an elevated temperature intimately contacting the potash ore with the heated leach liquor to leach the potassium chloride therefrom and produce a hot pregnant leach liquor, recovering the potassium chloride from the pregnant leach liquor, and recycling the leach liquor after recovery of the potassium chloride to the leach liquor heating step.

2. The process of claim 1 wherein the ore is Carlsbad-type potash ore and the gaseous mixture contacted with the ore contains at least one volume of steam for each three volumes of gaseous mixture.

3. A process for leaching potash ore containing substantial amounts of potassium chloride and sodium chloride comprising burning carbonaceous fuel and oxygen-containing gas in a submerged combustion heater immersed in an aqueous leach liquor to thereby heat the leach liquor and produce a hot gaseous mixture containing combustion gases and steam, the leach liquor being under a superatmospheric pressure and the fuel and oxygen-containing gas being burned in an amount to heat the leach liquor to a temperature greater than 212° F., the gaseous mixture being under a superatmospheric pressure as produced and initially having a temperature greater than 212° F. and containing at least 10% by volume of steam, intimately contacting the hot mixture of combustion gases and steam with at least one body of mined potash ore in particulate form to heat the potash ore to an elevated temperature, intimately contacting the heated leach liquor with a body of the heated potash ore to thereby leach the potassium chloride from the potash ore and produce a pregnant leach liquor, recovering the leached potassium chloride from the pregnant leach liquor, and recycling the leach liquor after recovery of the potassium chloride to the leach liquor heating step.

4. The process of claim 3 wherein the ore is Carlsbad-type potash ore and the gaseous mixture contacted with the ore contains at least one volume of steam for each three volumes of gaseous mixture.

5. A process for leaching potash ore containing substantial amounts of potassium chloride and sodium chloride comprising burning carbonaceous fuel and oxygen-containing gas in a submerged combustion heater immersed in an aqueous leach liquor to thereby heat the leach liquor and produce a hot gaseous mixture containing combustion gases and steam, the leach liquor being under a superatmospheric pressure and the fuel and oxygen-containing gas being burned in an amount to heat the leach liquor to a temperature greater than 212° F., the gaseous mixture being under a superatmospheric pressure as produced and initially having a temperature greater than 212° F. and containing at least 10% by volume of steam, passing the hot mixture of combustion gases and steam while under superatmospheric pressure upward through at least one body of mined potash ore in particulate form whereby the body of ore is heated to an elevated temperature, passing the heated leach liquor downward through a body of the heated potash ore to thereby leach potassium chloride from the potash ore and produce a hot pregnant leach liquor, passing the hot pregnant leach liquor to a crystallization zone, cooling the hot pregnant leach liquor to a lower temperature to precipitate the potassium chloride and produce a relatively cool mother liquor, separating the precipitated potassium chloride from the mother liquor, and recycling the cool mother liquor to the leach liquor heating step whereby it is heated to an elevated temperature to produce heated leach liquor.

6. The process of claim 5 wherein the ore is Carlsbad-type potash ore and the gaseous mixture contacted with the ore contains at least one volume of steam for each three volumes of gaseous mixture.

References Cited
UNITED STATES PATENTS

| | | | |
|---|---|---|---|
| 1,685,214 | 9/1928 | Gramer | 23—312 |
| 2,792,282 | 5/1957 | Pike | 23—38 |
| 3,245,755 | 4/1966 | Comer | 23—63 |
| 3,246,962 | 4/1966 | Miller | 23—63 X |
| 3,285,834 | 11/1966 | Guerrieri | 159—16 X |
| 3,215,189 | 11/1965 | Bower | 202—174 X |

OTHER REFERENCES

"The Chemical News Parade" (Parade), Chemical and Engineering News, vol. 26, #28, July 12, 1948, pp. 2062 to 2063.

Cronan, Chemical Engineering, February 1956, p. 16, "Thermal," Thermal Manual Submerged Combustion, Thermal Research and Engineering Corp., Pa., 1961, pp. 1 to 5, and 22 to 27.

NORMAN YUDKOFF, *Primary Examiner.*

S. EMERY, *Assistant Examiner.*